United States Patent

[11] 3,622,485

| [72] | Inventors | Robert A. Preece;<br>William G. Topham, both of Liverpool, England |
|---|---|---|
| [21] | Appl. No. | 806,780 |
| [22] | Filed | Mar. 7, 1969 |
| [45] | Patented | Nov. 23, 1971 |
| [73] | Assignee | Goodlass Wall and Company Ltd.<br>Speke Liverpool, England |
| [32] | Priority | Mar. 9, 1968 |
| [33] | | Great Britain |
| [31] | | 11,612/68 |

[54] ELECTRODEPOSITION
8 Claims, No Drawings

[52] U.S. Cl. .................................................. 204/181
[51] Int. Cl. .................................................. B01k 5/02, C23b 13/00
[50] Field of Search .................................................. 204/181

[56] References Cited
UNITED STATES PATENTS

| 3,392,101 | 7/1968 | Barrett et al. .................. | 204/181 |
| 3,491,011 | 1/1970 | Le Bras et al. .................. | 204/181 |

FOREIGN PATENTS

| 482,548 | 3/1938 | Great Britain .................. | 204/181 |

*Primary Examiner*—Howard S. Williams
*Attorney*—Beveridge & De Grandi

ABSTRACT: The electrophoretic deposition technique of a film of resin on a metal object from an aqueous dispersion of the resin using alternating current is improved by using an aluminum electrode and particularly one of commerically pure aluminum.

ELECTRODEPOSITION

The present invention relates to the deposition of a film of resin on a metal object. More particularly, the present invention relates to the electrophoretic deposition of a film of resin on a metal object from an aqueous dispersion of the resin.

U.S. Pat. No. 3,392,101 describes a process for the electrophoretic deposition of a film of a pigmented or unpigmented resin on a metal object in which the voltage applied to the electrophoretic cell is an alternating current voltage, the resin having free acid groups and being dispersed in the cell in an aqueous dispersion containing a base.

In this process, suitable operating conditions for the cell are 100 to 250 volts AC at an initial current density of 8 to 15 amps/sq.ft. for a period of time from 30 seconds to 2 minutes.

The acidic resin and base used may be described in the U.S. Pat. No. 3,378,477.

One electrode of the electrophoretic cell may be formed from a piece of wire, e.g., steel wire, whereby a continuous smooth coating is formed over all the surface of one or more other electrodes, i.e., the metallic objects to be coated. The process may be carried out continuously. The coated metallic object may be removed from the aqueous dispersion and baked or stoved at elevated temperature.

According to one aspect of the present invention, the wire electrode in the above process is made of aluminum especially aluminum of high commercial purity. In this way, the quality of the coating on the metal objects is improved.

Moreover, the aluminum electrode is itself less liable to become coated and as a result, problems encountered in cleaning the aluminum electrode are lessened or eliminated.

According to another aspect of the invention, an electrode of aluminum strip may be used in place of the aluminum wire electrode.

In general, therefore, according to the present invention, a process for the electrophoretic deposition of a pigmented or unpigmented resin on a metal object uses at least one electrode made of aluminum. The precise shape of the aluminum electrode is not critical but the surface area of this electrode should be small compared with that of the object to be coated, which forms the other electrode.

The reason for the aluminum electrode remaining uncoated during the operation of the cell is that this electrode produces, when immersed in a paint bath, a rectification effect, and the aluminum electrode therefore acts as a true cathode during the coating period.

This may be demonstrated as indicated below.

Single phase alternating current at frequency of 50 c.p.s. is passed through an autotransformer and then through an isolating switch, a resistance, of value about 10 ohms, and an electrodeposition cell. This cell, of capacity approximately 4 litres, contains a mild steel electrode of size 10 cm.×15 cm.×1 mm. thickness and a commercially pure aluminum electrode of size 1 cm.× 10 cm.×0.5 mm. thickness, and is filled with an electrodeposition paint prepared as in example 3 below. Connections are taken from the ends of the resistance to the appropriate terminals of a cathode-ray oscilloscope preferably of the double beam type whose time base controls have been adjusted to illustrate the alternating nature of a voltage derived from the mains 50 c.p.s. alternating current supply. If necessary an ammeter can be inserted into the circuit, between the resistance and the aluminum electrode to measure the current passed by the cell, or alternatively the value of the current, as well as its direction, can be ascertained from a knowledge of the value of the resistance, the height of the cathode-ray oscilloscope tube trace, and the scale of reproduction employed.

On filling the cell, setting the auto transformer to deliver current at a voltage of 100 (root mean square value), and closing the isolating switch, current passes through the cell, and the cathode-ray oscilloscope trace has a waveform which indicates that this current is unidirectional, half wave rectification having taken place. As deposition proceeds the height of the voltage peaks decreases, indicating that the current is falling, until 2 minutes after closing the circuit, the average value of the current has fallen to about one-twentieth of that initially flowing. At this stage what may be termed a "leakage" current still passing can be seen to possess a component flowing in the reverse direction, but this component is very small, compared with the main current flow and is of the order of 10–15 percent of the main current.

It is noticed in the course of experimental work that the rectification action depends on the formation of a surface film on the aluminum electrode and the most efficient rectification occurs once the aluminum plate has functioned as an electrode. Thus although a previously used aluminum electrode gives the required rectification effect immediately, an unused piece of aluminum gives the waveform referred to above only after about 5 seconds operation. Similarly, a previously used or "formed" aluminum electrode if thoroughly burnished with a fine abrasive paper again does not provide the required rectification until the cell has operated for approximately 5 seconds.

If the steel panel is removed when the current has fallen to a low value and washed free from the dip coat it is seen to be coated with a firm, uniform, paint film, which after stoving under suitable conditions is converted to a smooth, tough, and adherent dried film.

Similar results are obtained when the aluminum strip electrode is increased or decreased in size relative to the steel electrode, but with a relatively large aluminum electrode the surface film is not formed as readily, while in the case of a relatively smaller size, the limit is fixed by the overall cell resistance.

If in the arrangement described above the aluminum strip electrode is replaced by a steel strip electrode of size approximately 0.5 cm.×15 cm.×1 mm., and an alternating current voltage of 100 again used, the cathode-ray oscilloscope trace indicates that initially no rectification effect occurs, although approximately 30 seconds after completing the circuit partial rectification is obtained. This partial rectification continues until the circuit is broken after 2 minutes, and when the electrodes are removed and washed, both are found to be coated with an adherent paint film. A similar result is obtained when the voltage is either increased or decreased.

A more pronounced rectification effect is observed when the area of the steel strip electrode is reduced still further, relative to the steel panel, although when the electrodes consist of two steel panels of equal size no rectification occurs, and the current simply diminishes with time.

In all cases the steel panel is found to be coated with a uniform, adherent paint film, which although less smooth than when an aluminum strip electrode is employed, can be stoved at 150° C. for approximately 30 minutes to yield a tough uniform coating.

In general, the preferred resin used in the process of the invention is one having free carboxylic acid groups. It may be an alkyd resin, such as that derived from drying oil fatty acids, polyhydric alcohols and trimellitic anhydride, or it may be an epoxy ester resin, such as a carboxylic acid anhydride modified partially fatty acid ester of an epoxy resin.

The base used in the process may be ammonia, an alkali metal hydroxide such as caustic soda, or an organic base such as an alkylamine or alkanolamine.

If a pigment is needed in the process, titanium dioxide or carbon black may be used.

Suitable operating conditions for the cell used in the process are 30 to 500 volts alternating current at an initial current density of 5 to 20 amps per square foot and for a period of time of from 30 seconds to 5 minutes. The voltage applies is conveniently a symmetrical alternating voltage of normal mains frequency, for example 50 or 60 cycles per second.

The invention is further illustrated in the following examples.

EXAMPLE 1

A black enamel was prepared from an alkyd resin produced by charging 2.0 moles of trimellitic anhydride, 3.26 moles of propylene glycol and 1.05 moles of dehydrated castor oil fatty acids into a three-necked, round-bottomed flask fitted with stirrer, thermometer and heating apparatus. The mixture was heated to a final temperature of 200° C. using a nitrogen sparge until an acid value of approximately 45 mg. KOH/gm. was obtained. The resin was thinned with a mixture of butyl alcohol and solvent naphtha, i.e., an aromatic hydrocarbon solvent with a boiling range of 160–200° C., in the ratio of 3:2 by weight to give a 75 percent solids solution whose viscosity was approximately 30 poises at 25° C.

The black electrodeposition enamel was next prepared as shown below:

| | Deionized grams |
|---|---|
| 75 % solids alkyd resin solution | 700 |
| Carbon black pigment | 52 |
| Triethanolamine | 62 |
| Deionized water | 4,956 |

The alkyd resin solution was ground on a three-roll mill and the triethanolamine subsequently incorporated by stirring rapidly for 1 minute, after which the de-ionized water was slowly added again with stirring to give an aqueous pigmented resin dispersion with a solids content of 10 percent.

An electrophoretic cell was set up with electrodes consisting of a 4 inch×4 inch steel plate and a thin aluminum wire, attached to the two terminals of the secondary winding of a power transformer. The cell was filled with the pigmented resin dispersion described above and a potential difference of 240 volts alternating current at mains frequency applied across the cell. An initial current of several amperes passed which fell after 2 minutes to a very low value at which stage the supply was disconnected.

On removing the panel and washing free of the thin loosely adherent dip coat, it was found to be coated with an adherent layer of pigmented resin dispersion covering all parts of the immersed metal surface including the sharp edges.

After heating in an oven set at 150° C. for 30 minutes and allowing to cool a smooth, glossy, tough and adherent uniform coating was obtained which closely followed the contours of the metal panel. The film had a thickness of approximately 0.001 inch and a pencil surface hardness of F-H and was generally of a good commercial quality.

EXAMPLE 2

The alkyd resin solution described in example 1 was used to prepare a white enamel, as shown below:

| | grams |
|---|---|
| 75 % solids alkyd resin solution | 650 |
| Titanium dioxide | 97 |
| Triethanolamine | 57 |
| De-ionized water | 5,046 |

The white pigmented resin dispersion was prepared by using a three-roll mill as in the case of the previous example and after reduction to 10 percent solids content used to fill an electrophoretic cell constructed as in the case of the example using the black paint.

A potential difference of 240 volts alternating current at mains frequency was applied across the cell when again an initial current of several amperes passed, falling to a low value after 2 minutes. The panel was then withdrawn from the cell and after washing found to be coated with a uniform adherent layer of pigmented alkyd resin. After stoving at 150° C. for 30 minutes a smooth, glossy tough and adherent coating was obtained. The film had a thickness of approximately 0.0006 inch and a pencil surface hardness of F-H. Although slight discoloration had occurred, such a finish would have many commercial applications.

The aluminum wire used in these experiments had an aluminum content of 99 percent, the balance consisting of small quantities of alloying elements. The invention is, however, not limited to the use of this quality of aluminum, and aluminum alloys of higher or lower aluminum content may also be used.

EXAMPLE 3

A black electrodeposition paint was prepared as follows:

A phthalic anhydride modified epoxy ester resin was prepared by heating together at 220° C., 33.37 parts of a semidrying oil fatty acid (linseed oil fatty acid), and 43.6 parts of Epikote DX 20 (an epichlorhydrin bisphenol A epoxide resin having an epoxide equivalent weight of 450–500) in the presence of 0.02 parts of hydrated sodium carbonate until the acid value had fallen to below 10 mg. KOH/gm. All parts are by weight. At this stage the temperature was reduced to 130° C., 10.0 parts of phthalic anhydride were introduced and cooking was continued at 140° C. until the acid value reached 50 mg. KOH/gm. The resin was then thinned with 15 parts of ethylene glycol mono-butyl ether to give an 85 percent solids content solution.

This medium was then pigmented by grinding in a ball mill 20.4 parts of carbon black pigment, 87.5 parts of the epoxy ester resin solution described above, 6.2 parts of triethylamine, 91.1 parts of ethylene glycol mono-butyl ether and 124.6 parts of de-ionized water.

When the required fineness of grind had been obtained the pigment concentrate was thinned with 392 parts of the above epoxy ester resin solution, 27.5 parts of triethylamine and 180 parts of de-ionized water while stirring rapidly. The resultant concentrated paint had a solids content of approximately 50 percent, and the free acidity was fully neutralized.

A 10 percent solids content paint was next produced by thinning the above concentrated paint in the ratio of 1 part of paint to 4 parts of de-ionized water by weight, and this paint used to fill a cell of the type shown in diagram 1, in which one electrode was formed from a piece of clean mild steel of size 10 cm.×15 cm.×0.1 cm. thickness, and the other from a strip of commercially pure aluminum of size 10 cm.×1 cm.×0.1 cm. thickness. Both electrodes were immersed to a depth of 10 cm.

On applying alternating current at a frequency of 50 cycles per second and a voltage of 80 volts, a direct current which was seen almost immediately to be half wave rectified was observed to pass. The current had an initial value of between 1 and 2 amperes, and after 2 minutes had fallen to a value of 0.05 amperes. At this stage the circuit was broken, and the steel panel removed, rinsed with water, dried with a stream of compressed air, and stoved at a temperature of 150° C. for 30 minutes. The panel was then seen to be coated uniformly with a smooth, glossy, tough and adherent film of paint. When the aluminum electrode was removed and similarly washed all traces of paint were immediately removed.

EXAMPLE 4

The experiment described in example 3 was repeated using the aluminum strip previously used, and this time the results were the same except that the current was seen to be half wave rectified immediately the circuit was made.

EXAMPLE 5

The experiment described in example 3 was repeated using a commercially pure aluminum electrode of size 10 cm.×0.5 cm.×0.1 cm., and alternating current at a frequency of 50 cycles per second and a voltage of 100. Almost immediately after completing the circuit the current was seen to be half wave rectified current, and again the initial current had a value of 1–2 amperes falling rapidly until after 2 minutes the value was 0.05 amp.

After washing and drying, the panel was stoved at 150° C. for 30 minutes, when a uniform smooth, glossy, tough and adherent film of paint was obtained.

EXAMPLE 6

The experiment described in example 3 was repeated using a commercially pure aluminum electrode of size 10 cm.×2 cm.×0.1 cm. and alternating current at a frequency of 50 cycles per second and a voltage of 80.

Immediately on closing the circuit the current was seen to be incompletely rectified, but within about 10 seconds complete half wave rectification occurred, and the current, of initial value 1–2 amperes, fell to a value of 0.08 amps. after a period of approximately 2 minutes.

On washing, drying and stoving the panel, as described in example 5, a uniform, smooth, glossy, tough and adherent film of paint was obtained.

We claim:

1. A process for the electrophoretic deposition of a film of a resin on a metal object, which comprises:
   a. dispersing a resin in an aqueous medium containing a base to form an aqueous dispersion of the resin, said resin being selected from
      1. an alkyd resin derived from drying oil fatty acids, polyhydric alcohols and trimellitic anhydride,
      2. an acrylic resin which is a copolymer of an acrylamide, an alkyl acrylate, acrylic acid or a methacrylic acid and styrene or vinyl toluene, and
      3. a carboxylic acid anhydride modified partial fatty acid ester of an epoxy resin;
   b. forming an electrolytic cell using the metal object as one electrode of the cell; and
   c. subjecting the aqueous dispersion to electrophoresis to deposit the resin on the metal object as an adherent film without depositing any substantial amount of the resin as an adherent film on said aluminum electrode, the voltage applied to the cell being an alternating current voltage.

2. A process as claimed in claim 1 in which the aluminum electrode is an aluminum wire.

3. A process as claimed in claim 1 in which the aluminum electrode is an aluminum strip.

4. A process as claimed in claim 1 in which the cell is operated at 30 to 500 volts symmetrical alternating current of mains frequency at an initial current density of 5 to 20 amps per square foot for a period of time from 30 seconds to 5 minutes.

5. A process as claimed in claim 1 in which a pigment is also dispersed in the aqueous medium.

6. A process according to claim 1 wherein said base is an organic base.

7. A process according to claim 1 wherein said resin is an alkyd resin prepared from trimellitic anhydride, propylene glycol and dehydrated castor oil fatty acids.

8. A process according to claim 1, wherein said resin is a phthalic anhydride modified epoxy ester resin.

* * * * *